United States Patent
Wu et al.

(10) Patent No.: US 9,117,097 B2
(45) Date of Patent: Aug. 25, 2015

(54) ELECTRONIC DEVICE USING DATA THEFT PROTECTION

(71) Applicant: Hon Hai Precision Industry Co., Ltd., New Taipei (TW)

(72) Inventors: Chi-Hsin Wu, New Taipei (TW); Mao-Chang Chuang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 11 days.

(21) Appl. No.: 14/048,146

(22) Filed: Oct. 8, 2013

(65) Prior Publication Data

US 2014/0304841 A1 Oct. 9, 2014

(30) Foreign Application Priority Data

Apr. 8, 2013 (TW) .............................. 102112268 U

(51) Int. Cl.
*G06F 21/86* (2013.01)

(52) U.S. Cl.
CPC ...................................... *G06F 21/86* (2013.01)

(58) Field of Classification Search
None
See application file for complete search history.

(56) References Cited

U.S. PATENT DOCUMENTS

| 5,790,670 | A  | * | 8/1998  | Bramlett  | 380/52  |
| 6,374,310 | B2 | * | 4/2002  | Isomura   | 710/15  |
| 8,359,660 | B2 | * | 1/2013  | Lang      | 726/34  |
| 2001/0056543 | A1 | * | 12/2001 | Isomura   | 713/200 |
| 2009/0271878 | A1 | * | 10/2009 | Lai       | 726/34  |
| 2011/0055086 | A1 | * | 3/2011  | McNicoll  | 705/72  |
| 2011/0208963 | A1 | * | 8/2011  | Soffer    | 713/168 |
| 2011/0280093 | A1 | * | 11/2011 | Takeda    | 365/218 |

FOREIGN PATENT DOCUMENTS

| CN | 201063057 | 5/2008 |
| CN | 201667076 | 12/2010 |

\* cited by examiner

*Primary Examiner* — Benjamin Lanier
(74) *Attorney, Agent, or Firm* — Novak Druce Connolly Bove + Quigg LLP

(57) ABSTRACT

An electronic device includes a washer, a printed circuit board, and a screw. The printed circuit board includes a copper foil, a detecting unit and a processing unit. The copper foil comprises a plurality of electrical signal interfaces surrounding a first via defined in the copper foil. The washer defines a second via and includes a transmission metal. The screw combines the printed circuit board and the washer through the second via and the first via. The detecting unit stores an original logic level signal, and detects logic level signals of the electrical signal interfaces in real-time. The processing unit compares the original logic level signal and the detected logic level signal, to determine whether the electronic device is disassembled. If the electronic device is disassembled, the electronic device stops working.

7 Claims, 5 Drawing Sheets

ELECTRONIC DEVICE USING DATA THEFT PROTECTION

BACKGROUND

1. Technical Field

The disclosure relates to electronic devices, and particularly to an electronic device using data theft protection with a plurality of electrical signal interfaces.

2. Description of Related Art

Important data is stored in a data circuits of electronic devices, and if the data is lost, consequences could be tragic. To obtain the data, the electronic devices is often disassembled. Therefore, it is a big challenge to provide an electronic device which can be protected against data theft by disassembly.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
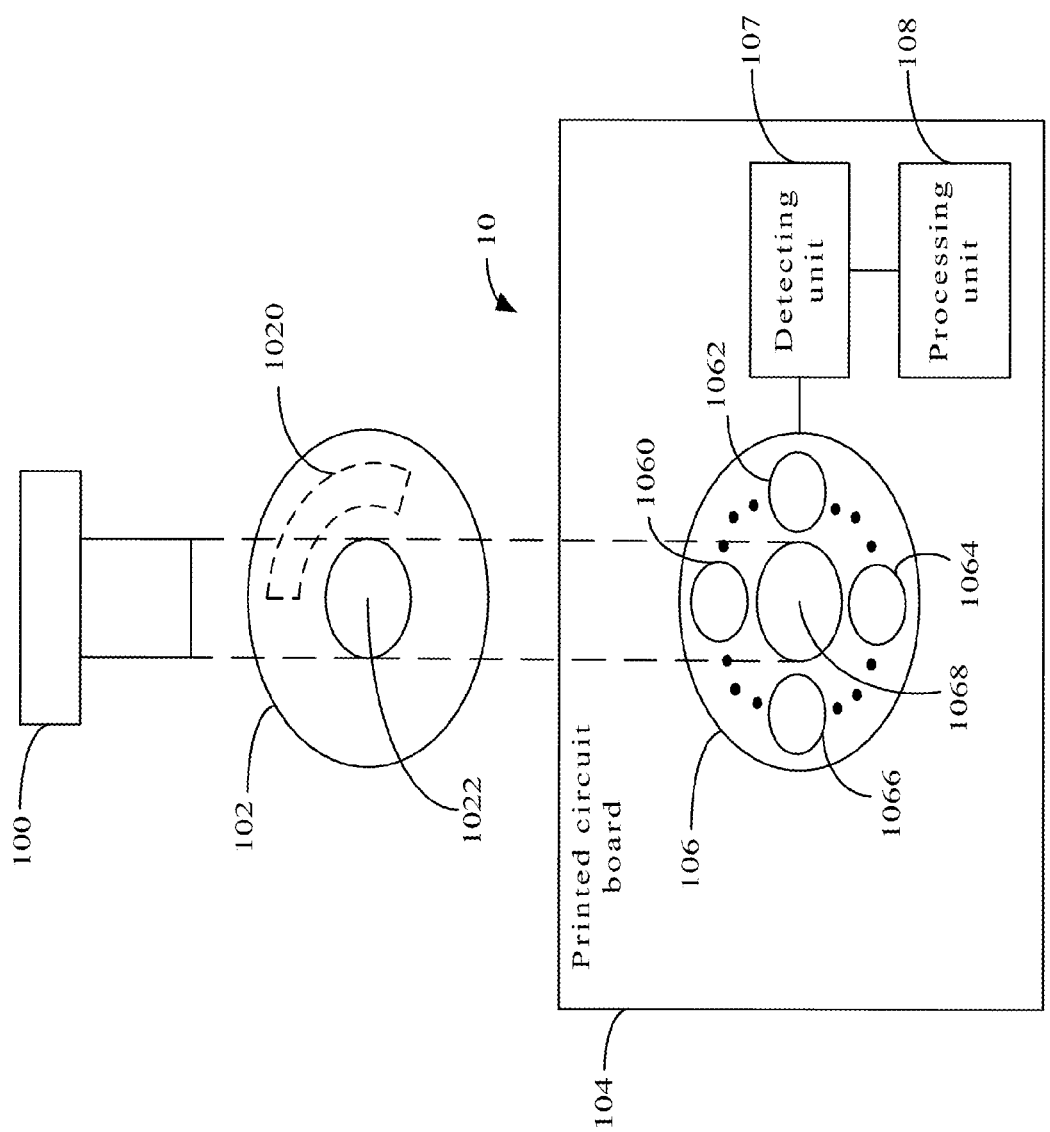
FIG. 1 is a diagram of one embodiment of an electronic device.

FIG. 1 is a diagram of one embodiment of an electronic device 10. The electronic device 10 includes a screw 100, a washer 102 and a printed circuit board 104. The printed circuit board 104 includes a copper foil 106, a detecting unit 107, and a processing unit 108.

Figure 2:
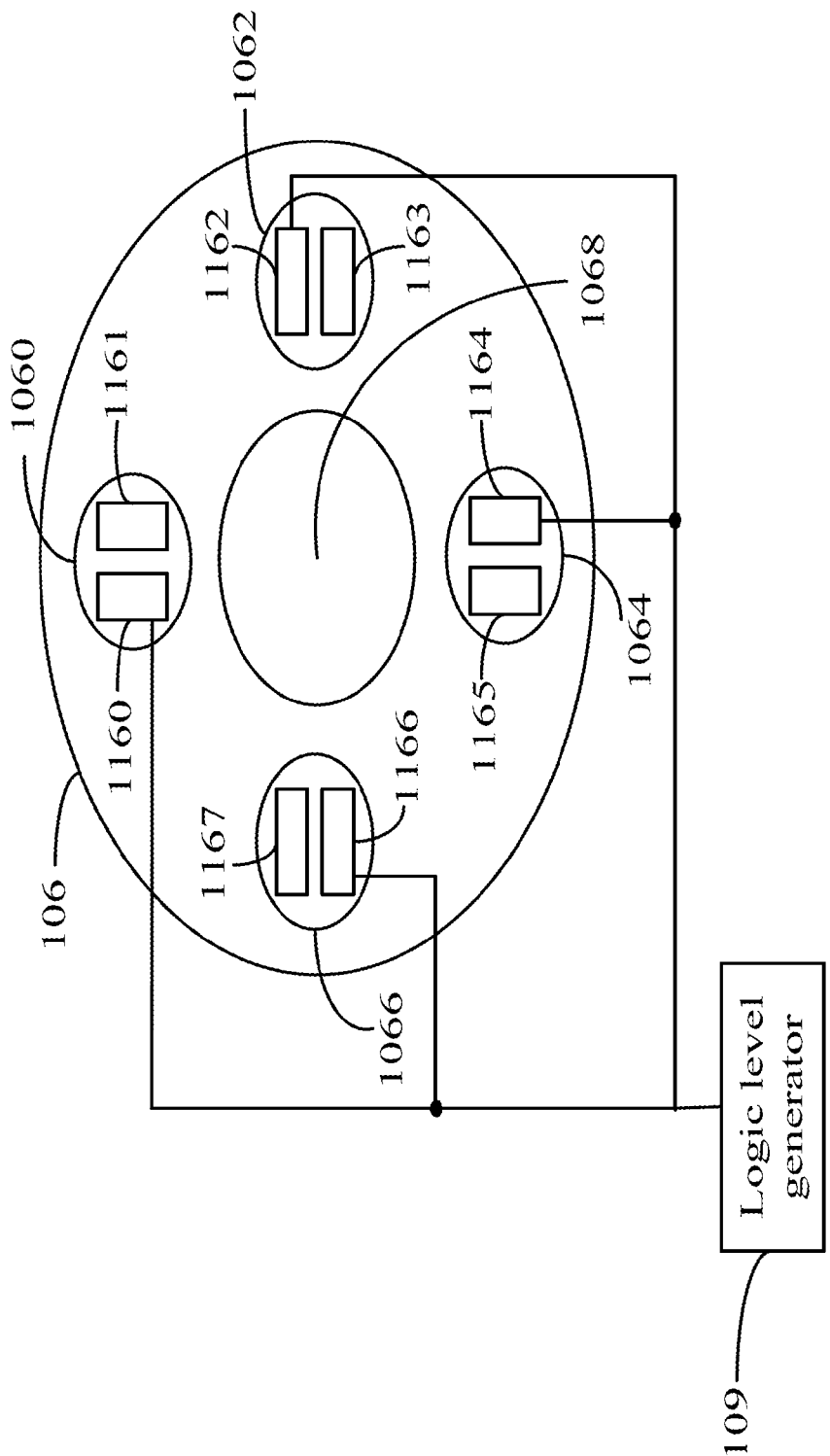
FIG. 2 is a top view of a copper foil of one embodiment of the electronic device of FIG. 1.

FIG. 2 is a top view of a copper foil 106 of one embodiment of the electronic device 10 of FIG. 1. A middle of the copper foil 106 defines a first via 1068 that passes through the screw 100. A top of the copper foil 106 defines a plurality of electrical signal interfaces surrounds the first via 1068. In one embodiment, the electrical signal interfaces are general purpose input output ports (GPIOs). In detail, the number of the GPIOs is a natural number n, and the natural number n is greater than 3 or equal to 3. The following takes the natural number n is equal to 4, for example, to describe this clearly. The copper foil 106 of FIG. 1 and FIG. 2 comprises a first GPIO 1060, a second GPIO 1062, a third GPIO 1064, and a fourth GPIO 1066. Each of the GPIOs comprises a logic level port and an output port, and all of the logic level ports of the GPIOs are electrically connected to a logic level generator 109 of the printed circuit board 104.

In one embodiment, the logic level generator 109 is a logic 1 level generator, for generating a logic 1 signal. In response to the logic level port being connected to the output port, the output port outputs a logic 1 signal, and in response to the logic level port not being connected to the output port, the output port outputs a logic 0 signal.

In one embodiment, the first GPIO 1060 comprises a first logic 1 port 1160 and a first output port 1161, the second GPIO 1062 comprises a second logic 1 port 1162 and a second output port 1163, the third GPIO 1064 comprises a third logic 1 port 1164 and a third output port 1165, and the fourth GPIO 1066 comprises a fourth logic 1 port 1166 and a fourth output port 1167. All of the first logic 1 port 1160, the second logic 1 port 1162, the third logic 1 port 1164 and the fourth logic 1 port 1166 are electrical connected to the logic level generator 109, to receive the logic 1 signal generated by the logic level generator 109. In response to the first logic 1 port 1160 being electrically connected to the first output port 1161, the first logic 1 port 1160 outputs the logic 1 signal to the first output port 1161, and at this moment the first GPIO 1060 outputs a logic 1 signal.

The detecting unit 107 is connected to the copper foil 106, to store an original logic level signal output by these four GPIOs of factory settings, and continuously detect a real-time logic level signal of these four GPIOs. In one embodiment, by the arrangement of the first GPIO 1060, the second GPIO 1062, the third GPIO 1064 and the fourth GPIO 1066 showing those logic level signals detected by the detecting unit 107, in response to all of the four GPIOs outputting logic 0 signals, the real-time logic level signal of the four GPIOs show "0000". The arrangement of logic level signals is not limited to the above arrangement. For example, the arrangement of logic level signals may be the arrangement of the second GPIO 1062, the third GPIO 1064, the fourth GPIO 1066 and the first GPIO 1060, also the arrangement of logic level signals may be the arrangement of the fourth GPIO 1066, the third GPIO 1064, the second GPIO 1062 and the first GPIO 1060, or other arrangements.

The processing unit 108 is connected to the detecting unit 107. The processing unit 108 determines whether the screw 100 is removed by comparing the original logic level signal and the real-time logic level signal, to determine whether the electronic device 10 is disassembled.

Figure 3:
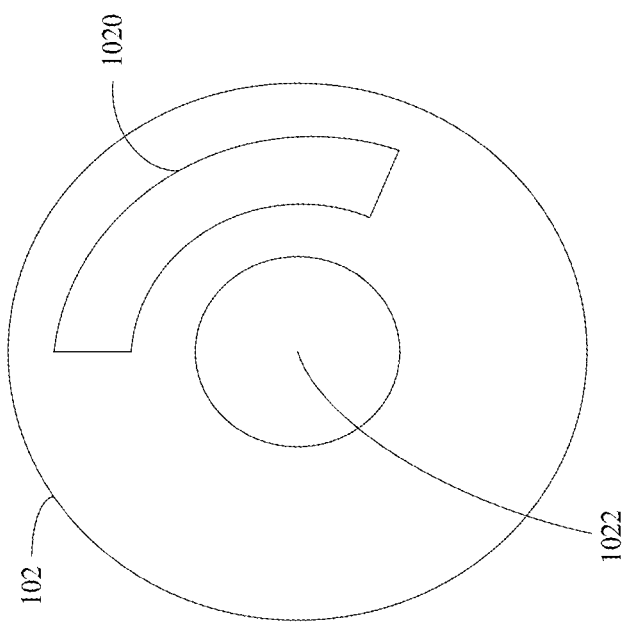
FIG. 3 is a bottom view of a washer of one embodiment of the electronic device of FIG. 1 as disclosed.

FIG. 3 is a bottom view of a washer 102 of one embodiment of the electronic device 10 of FIG. 1 as disclosed. The middle of the washer 102 defines a second via 1022 passing through the screw 100, where the washer 102 includes a transmission metal 1020, the remainder of the washer 102 is made of insulative material. The transmission metal 1020 connects with the GPIOs of the copper foil 106, to make the GPIOs output logic 1 signals. In one embodiment, the transmission metal 1020 of the washer 102 is arc-shaped, and the radius of the arc transmission metal 1020 varies depending on the changes of the number of the GPIOs. The radius of the arc transmission metal 1020 is greater than 360/n and less than 360/n−2) and best can be 360/(n−1). For example, in response to n be equal to four, the radius of the arc transmission metal 1020 is greater than 90 and less than 180, and maximum can be 120. In one embodiment, shape and the size of the copper foil 106 is the same as the washer 102, and the shape and the size of the second via 1022 is the same as the first via 1068, to mate with the screw 100. In other embodiments, the shape of the arc transmission metal 1020 can be other shapes.

In one embodiment, when the electronic device 10 is assembled, the screw 100 combines the washer 102, the printed circuit board 104 and the shell of the electronic device 10 via the back shell (not shown) of the electronic device 10, the first via 1068, the second via 1022 and the head cover (not shown) of the electronic device 10, the user cannot see the washer 102 and the copper foil 106 from outside the electronic device 10.

In one embodiment, because the transmission metal 1020 of the washer 102 connects with the copper foil 106 of the GPIOs, that is, the bottom view of a washer 102 in FIG. 3 connects with the top view of a copper foil 106 in FIG. 2, the transmission metal 1020 connects with the GPIOs of the copper foil 106 at different positions to make the GPIOs output different logic level signals.

Figure 4:
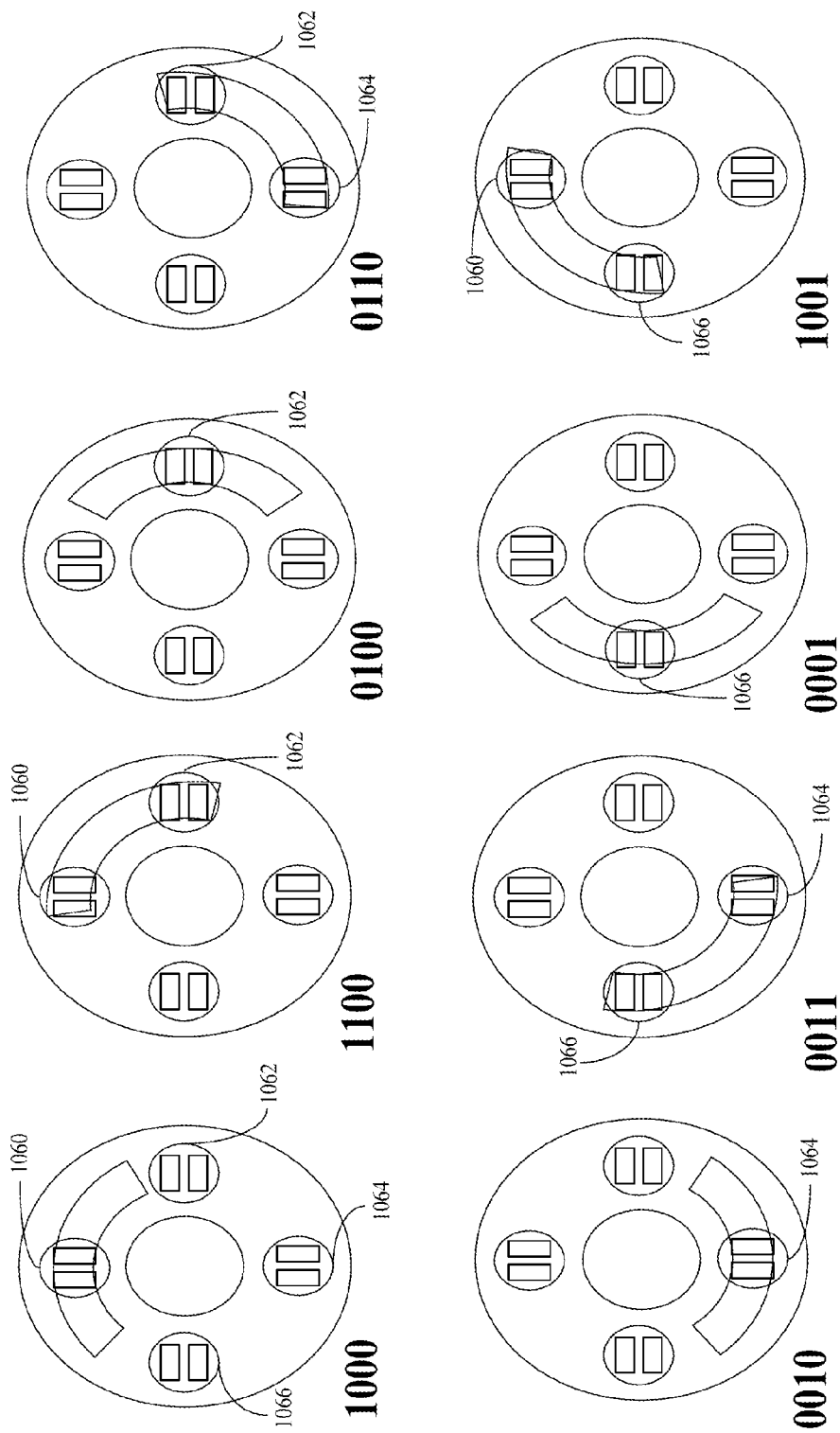
FIG. 4 is a diagram of eight different circumstance of laminating of FIG. 2 and FIG. 3 as disclosed.

FIG. 4 is a diagram of eight different circumstance of laminating of FIG. 2 and FIG. 3 as disclosed. In one embodiment, in response to the number of the GPIOs which is electrically connected to the transmission metal 1020 being one or two, and the output logic level signals must output eight different logic level signals because of the transmission metal 1020 connects with the GPIOs of the copper foil 106 at different positions. For example, taking the first figure on the left in FIG. 4, the transmission metal 1020 connects with only with the first GPIO 1060, then the first GPIO 1060 outputs a logic 1 signal, the other GPIOs output logic 0 signals, and the logic level signals detected by the detecting unit 107 is "1000". Again for example, taking the first figure on the right of FIG. 4, both the second GPIO 1062 and the third GPIO 1064 connect with the transmission metal 1020, then the second GPIO 1062 and the third GPIO 1064 output logic 1 signals, the other GPIOs output logic 0 signals, and the logic level signals detected by the detecting unit 107 is "0110".

In one embodiment, when the electronic device 10 is powered on, the detecting unit 107 detects the real-time logic level signal of these four GPIOs, the processing unit compares the original logic level signal and the real-time logic level signal, if the original logic level signal is the same with the real-time logic level signal, the electronic device 10 works, if not the same, the electronic device 10 does not work. In one embodiment, when the electronic device 10 is disassembled and connected to a power supply, the transmission metal 1020 does not connect with anyone of these four GPIOs, but the original logic level signal must be electrically connected to one or two of these four GPIOs, in order for the processing unit 108 to determine whether the original logic level signal is different from the real-time logic level signal, to determine that the electronic device 10 has been disassembled, to stop the electronic device 10 from working, so as to protect against data theft. For further improving, the original logic level signal is encrypted and stored in the detecting unit 107.

In one embodiment, the original logic level signal stored in the detecting unit 107 is "0010", when the electronic device 10 is disassembled that the electronic device 10 is connected to power supply, the transmission metal 1020 does not connect with any of the GPIOs, and the real-time logic level signal is "0000", then the original logic level signal is different then the real-time logic level signal, the processing unit 108 stops the electronic device 10 from working.

Figure 5:
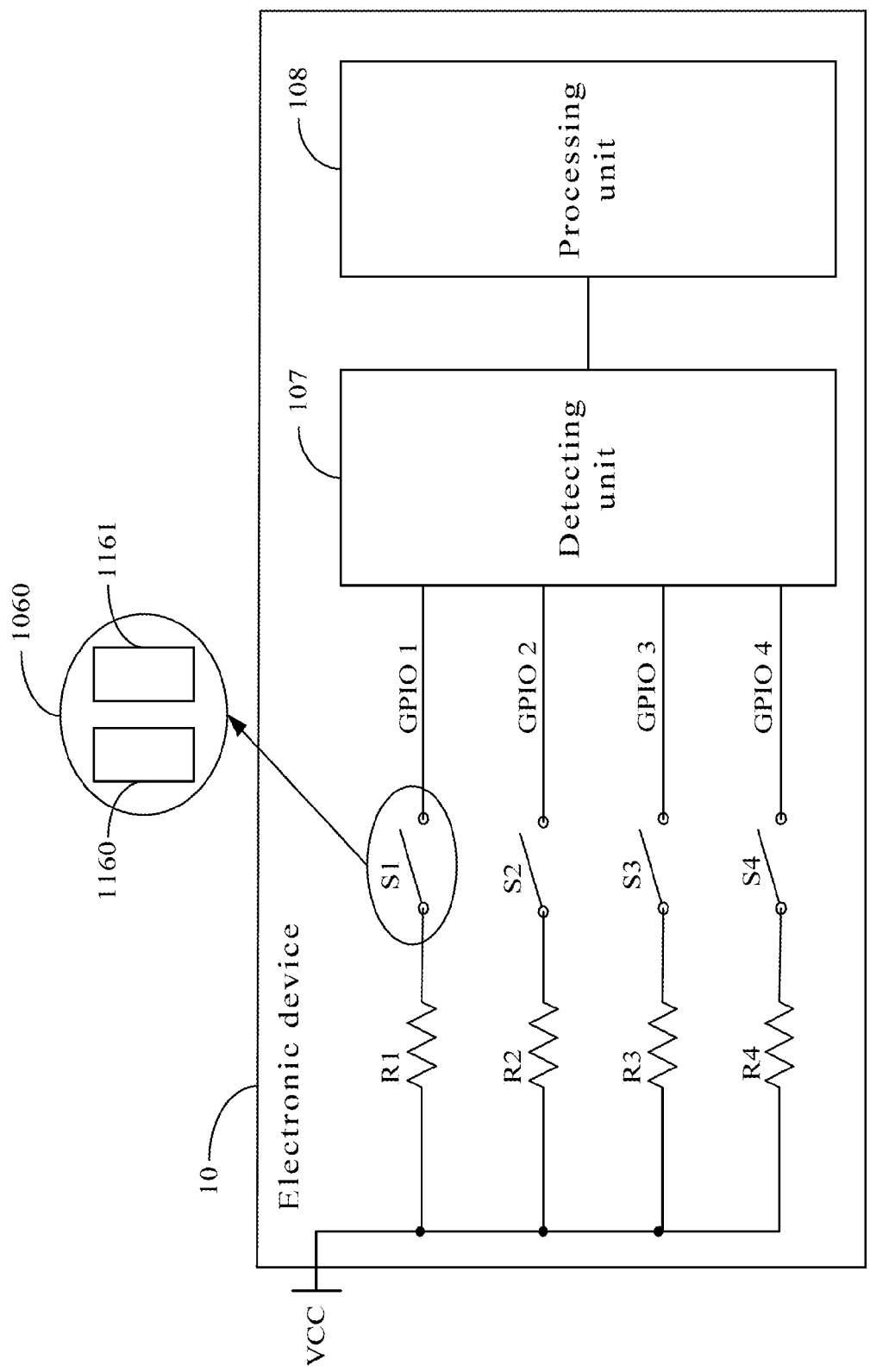
FIG. 5 is a circuit diagram of another embodiment of the electronic device.

FIG. 5 is a circuit diagram of another embodiment of the electronic device 10. In one embodiment, for simplicity, the GPIOs are shown as switches. The transmission metal 1020 just connects with the first GPIO 1060, as a first switch S1 is being closed.

The electronic device 10 comprises resistors R1-R4, switches S1-S4, the detecting unit 107 and the processing unit 108. In one embodiment, the resistors R1-R4 are connected in parallel with each other, and one end of the resistors R1-R4 are connected to external power supply VCC, the other end of the resistors R1-R4 are connected to one end of a first switch S1, a second switch S2, a third switch S3 and a fourth switch S4 respectively, and the other end of the switches S1-S4 are connected to the detecting unit 107. The processing unit 108 is connected to the detecting unit 107, to determine whether the screw 100 is unloaded by comparing the original logic level signal and the real-time logic level signal, to determine whether the electronic device 10 is disassembled. For example, the first GPIO 1060 of FIG. 2 is one embodiment of the first switch S1 of FIG. 4, the first logic high port 1160 and the first output port 1161 are two sides of the first switch S1. The transmission metal 1020 is electronic connected to two sides of the first switch S1, to make the first switch S1 close. Similarly, the second GPIO 1062, the third GPIO 1064 and the fourth GPIO of FIG. 2 are one embodiment of the second switch S2, the third switch S3 and the fourth switch S4 of FIG. 4, respectively.

In one embodiment, when the transmission metal 1020 connects only with the first GPIO 1060, the first logic high port 1160 is electronically connected to the first output port 1161, as the first switch S1 is closed, and the detecting unit 107 detects only that the first GPIO 1060 outputs a logic 1 signal. The processing unit 108 determine whether the screw 100 is unloaded by comparing the original logic level signal and the real-time logic level signal, to determine whether the electronic device 10 is disassembled. If the electronic device 10 is disassembled, the electronic device 10 stops working, to protect against data theft.

The foregoing disclosure of the various embodiments has been presented for purposes of illustration and description. It is not intended to be exhaustive or to limit the disclosure to the precise forms disclosed. Many variations and modifications of the embodiments described herein will be apparent to one of ordinary skill in the art in the light of the above disclosure. The scope of the disclosure is to be defined only by the claims appended hereto and their equivalents.

What is claimed is:

1. An electronic device, comprising:
   a printed circuit hoard comprising:
      a copper foil comprising a plurality of electrical signal interfaces surrounding a first via defined in the copper foil;
      a detecting unit storing an original logic level signal output by the electrical signal interfaces, and continuously detecting a real-time logic level signal of the electrical signal interfaces; and
      a processing unit determining whether the electronic device is disassembled by comparing the original logic level signal and the real-time logic level signal;
   a washer that defines a second via and includes a transmission metal; and
   a screw that connects the printed circuit board to the washer through the second via and the first via, wherein the transmission metal connects with the electrical signal interfaces of the copper foil at different positions to make the electrical signal interfaces output different logic level signals;
   wherein in response to determining the original logic level signal is different from the real-time logic level signal, the processing unit determines the electronic device is disassembled.

2. The electronic device of claim 1, wherein each of the electrical signal interfaces comprises:
   a logic level port connected to a logic level generator, to receive a first logic level signal generated by the logic level generator; and
   an output port, wherein in response to both the logic level port and the output port of one of the electrical signal interfaces connecting with the transmission metal, the output port of the corresponding electrical signal interface outputs the first logic level signal.

3. The electronic device of claim 1, wherein in response to the copper foil connecting with the transmission metal of the washer the electrical signal interfaces output a second logic level signal indicating which electrical signal interfaces connect with the transmission metal of the washer, the electrical signal interfaces output a third logic level signal indicating which electrical signal interfaces do not connect with the transmission metal of the washer.

4. The electronic device of claim 1, wherein the transmission metal of the washer is arc-shaped.

5. The electronic device of claim 4, wherein the radius of the arc transmission metal is equal to 360 divided by (n−1), and n is the number of the electrical signal interfaces.

6. The electronic device of claim 1, wherein the original logic level signal is encrypted and stored in the detecting unit.

7. The electronic device of claim 1, wherein in response to the electronic device being disassembled, the electronic device stops working.

* * * * *